United States Patent

Seki et al.

[11] Patent Number: 5,884,893
[45] Date of Patent: Mar. 23, 1999

[54] VIBRATION ISOLATOR FOR MOTOR

[75] Inventors: Masahide Seki; Satoru Horiuchi, both of Sagamihara; Masaji Itoh, Fujimi; Sokuei Kyo, Kawasaki, all of Japan

[73] Assignee: Showa Electric Wire & Cable Co., Ltd., Kawasaki, Japan

[21] Appl. No.: 825,093

[22] Filed: Mar. 27, 1997

Related U.S. Application Data

[63] Continuation of Ser. No. 330,138, Oct. 25, 1994, abandoned.

[30] Foreign Application Priority Data

Oct. 28, 1993 [JP] Japan ................... 5-270635

[51] Int. Cl.⁶ .................................... F16M 1/00
[52] U.S. Cl. .......................................... 248/638
[58] Field of Search ..................... 248/632, 633, 248/634, 635, 638, 562; 74/573 R; 384/215, 220, 221, 222, 535

[56] References Cited

U.S. PATENT DOCUMENTS

| | | | |
|---|---|---|---|
| 219,768 | 1/1879 | Albert L. Conwill | D8/233 |
| 304,714 | 11/1884 | Tanifuzi et al. | D13/1 |
| 3,215,477 | 11/1965 | Arthur | 384/222 |
| 4,198,078 | 4/1980 | Herbert | 285/49 |
| 4,452,417 | 6/1984 | Krafthefer et al. | 248/604 |
| 4,520,987 | 6/1985 | Eguchi et al. | 248/635 |
| 4,648,579 | 3/1987 | Wilson | 248/638 |
| 4,655,099 | 4/1987 | Hansen | 74/421 A |
| 5,040,764 | 8/1991 | Dubois | 248/635 |
| 5,058,867 | 10/1991 | Hadano et al. | 267/141.3 |
| 5,165,668 | 11/1992 | Gennesseaux | 267/140.15 |
| 5,169,130 | 12/1992 | Thelamon et al. | 267/140.12 |
| 5,191,028 | 3/1993 | Ishioka | 525/332.7 |
| 5,324,237 | 6/1994 | Bilsing et al. | 474/94 |
| 5,339,580 | 8/1994 | Koshika | 52/167 E |
| 5,507,463 | 4/1996 | Kobylinski et al. | 248/610 |

FOREIGN PATENT DOCUMENTS

| | | |
|---|---|---|
| 0 553 471 | 8/1993 | European Pat. Off. . |
| 1-71964 | 5/1989 | Japan . |
| 3-70754 | 3/1991 | Japan . |

*Primary Examiner*—Leslie A. Braun
*Assistant Examiner*—Gwendolyn Baxter
*Attorney, Agent, or Firm*—Foley & Lardner

[57] ABSTRACT

A vibration isolator is composed of a cylindrical elastomer body and a cylindrical inner fixing member and an outer fixing member both made of a metallic material. The inner fixing member and the outer fixing member have flange parts formed along the edges thereof. The inner fixing member which has a smaller diameter than the outer fixing member is fixed to the inside diameter side of the elastomer body and the outer fixing member is fixed to the outside diameter side of the elastomer body. The elastomer body is formed of either an elastomer having a thermal conductivity in the range of from $1.3\times10^{-3}$ to $7.1\times10^{-3}$ cal/cm•sec•° C. or a elastomer composition containing 50 to 200 parts by weight per 100 parts by weight of rubber. The vibration isolator constructed as described above enables the spring constant in the direction perpendicular to the axis to be increased without reducing the effect of isolating vibration so as to decrease the displacement of the motor and improve the accuracy of positioning thereof. It also provides effective radiation of the heat generated by the motor and prevents the motor from temperature elevation.

3 Claims, 4 Drawing Sheets

VIBRATION ISOLATOR FOR MOTOR

This application is a continuation of application Ser. No. 08/330,138, filed Oct. 25, 1994, now abandoned.

BACKGROUND OF THE INVENTION

1. Field of the Invention

This invention relates to a vibration isolator for a motor which is used for the purpose of preventing such stepping motors as are serving to feed papers in a facsimile or a copying machine or operate a printing head in a printer from generating vibration or emitting noise.

2. Description of the Related Art

In recent years, vibrations and noises emanating from various office automation (OA) machines copiously adopted for clerical works in consequence of the automation of business offices have come to pose a problem. One of the causes for the problem resides in the fact that when the motors built in the OA machines are in operation, the vibrations of these motors are transmitted to the frames of the machines. The practice of interposing a vibration isolator between the motors and the frames of the machines has been heretofore resorted to for precluding transmission of vibration and abating noise. FIG. 1A and FIG. 1B illustrate a conventional vibration isolator 1 to be used in the installation of a stepping motor. This vibration isolator 1 has a rubber body 4 (made of chloroprene or butyl rubber, for example) attached by means of vulcanization between two metal pieces containing fixing holes 2, . . . and is provided at the center thereof with a through hole 5 for allowing insertion therethrough of the drive shaft of a stepping motor (JP-U-1-71,964). This vibration isolator 1 is used as in a platen drive mechanism for a printer illustrated in FIG. 2 or in a paper feeding mechanism illustrated in FIG. 3, for example. It is inserted between a stepping motor 6 and a frame 7 and fastened thereto with bolts which are fitted into the fixing holes 2, . . . .

In the conventional vibration isolator 1, however, the spring constant thereof in the axial direction (namely in the direction of compression) is 1, whereas the spring constant thereof in the direction perpendicular to the axis (namely in the direction of shearing) is 0.2. Because of the small spring constant in the shearing direction as compared with that in the axial direction, this vibration isolator 1 is at a disadvantage in tending to be affected by a displacement in the shearing direction and being deficient in accuracy of positioning. In the case of such a gear drive device as the platen drive mechanism of the printer of FIG. 2, when a pinion 9 disposed around a drive shaft 8 of the stepping motor 6 rotates a gear 12 disposed round a platen shaft 11 of a platen 10, the drive shaft 8 and the pinion 9 are inevitably displaced in the shearing direction in response to the vibration of the stepping motor 6 because the spring constant of the vibration isolator 1 in the shearing direction (in the direction perpendicular to the drive shaft 8) is small. As a result, the backlash between the pinion 9 and the gear 12 is fluctuated to degrade the accuracy of positioning. In the case of such a belt drive device as the paper feeding mechanism of FIG. 3, since a pulley 13 disposed round the drive shaft 8 of the stepping motor 6 is connected to another pulley 14 through the medium of a belt 15, the tension of the belt 15 acts on the pulley 13 and the drive shaft 8 and consequently displaces the drive shaft 8, for example, in the shearing direction (in the direction perpendicular to the drive shaft 8).

For the elimination of these drawbacks, measures such as increasing the hardness of the rubber body 4 and decreasing the thickness thereof which are intended to increase the spring constant of the vibration isolator 1 in the direction perpendicular to the shaft thereof have been adopted. The effect of isolating vibration, however, is rather degraded when the spring constant in the direction perpendicular to the shaft is increased by these measures.

Incidentally, rubber has a thermal insulation. When the stepping motor 6 is set to driving as fixed on the frame 7 through the medium of the vibration isolator 1, therefore, the heat generated in the stepping motor 6 is insulated by the vibration isolator 1 and accumulated in the stepping motor 6 itself. The stepping motor 6, therefore, is at a disadvantage in acquiring satisfactory properties only with difficulty and suffering a decrease in service life.

SUMMARY OF THE INVENTION

An object of this invention, therefore, is to provide a vibration isolator for a motor which allows the spring constant thereof in the direction perpendicular to the axis to be increased without a sacrifice of the effect of isolating vibration so as to decrease the displacement of the stepping motor and improve the accuracy of positioning thereof.

Another object of this invention is to provide a vibration isolator for a motor which so excels in thermal conductivity as to permit effective radiation of the heat which is generated in the stepping motor.

This invention is directed to a vibration isolator for a motor which is characterized by comprising an elastomer body with an inner fixing surface and an outer fixing surface, an inner fixing member made of a hard material, fixed on the inner surface of the elastomer body, said inner fixing member including a flange part, and an outer fixing member made of a hard material, fixed on the outer surface of the elastomer body, said outer fixing including a flange part.

This invention is also directed to a vibration isolator for a motor which is characterized by comprising an elastomer body made of an elastomer having a thermal conductivity in the range of from $1.3 \times 10^{-3}$ to $7.1 \times 10^{-3}$ cal/cm•sec•° C. or an elastomer body containing 50 to 200 parts by weight of graphite per 100 parts by weight of rubber, and first and second fixing members made of a hard material with the elastomer body fixed therebetween.

In accordance with this invention, the accuracy with which such a motor as the stepping motor is positioned can be exalted because the spring constant in the direction perpendicular to the axis is increased without any sacrifice of the effect of isolating vibration so as to decrease the displacement in the direction perpendicular to the axis. Particularly when the stepping motor is used in a gear drive device, the vibration isolator of this invention can be effectively applied to the gear drive device unlike the conventional vibration isolator which substantially is hardly applicable to the gear drive device on account of fluctuation of the backlash between gears.

Further, this invention contemplates the incorporation of an elastomer body having a thermal conductivity in the range of from $1.3 \times 10^{-3}$ to $7.1 \times 10^{-3}$ cal/cm•sec•° C. or containing 50 to 200 parts by weight of graphite per 100 parts by weight of rubber. When a motor such as the stepping motor and a frame are connected to each other through the medium of this vibration isolator, therefore, the heat generated by the rotation of the motor passes through the elastomer body and radiates from the frame which has a large surface area. As a result, the motor can be precluded from elevation of temperature and prevented from degradation of characteristics and service life.

DESCRIPTION OF THE PREFERRED EMBODIMENTS

The vibration isolator of this invention will be described more specifically below with reference to embodiments.

Figure 1A:
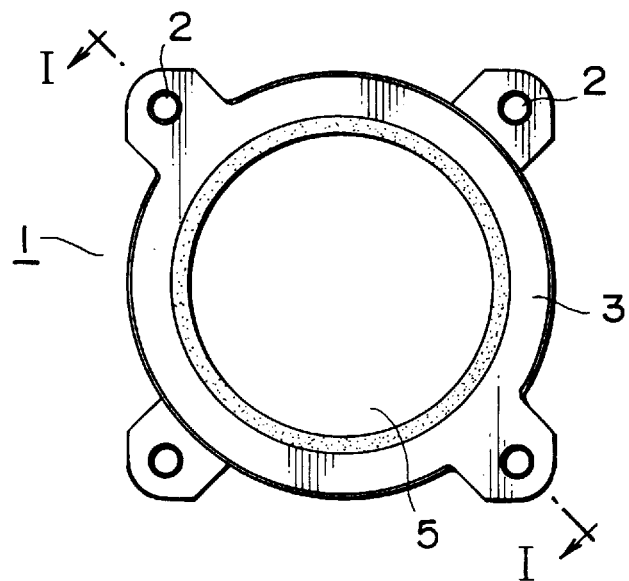
FIG. 1A is a plan view illustrating a conventional vibration isolator.
Figure 1B:
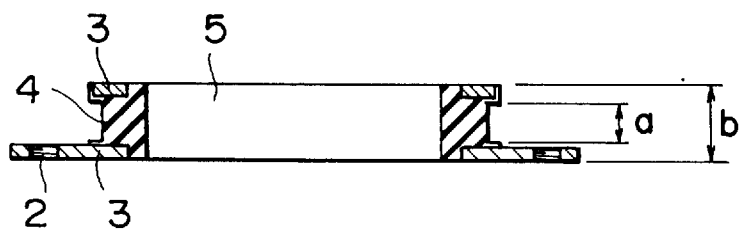
FIG. 1B is a cross section taken through FIG. 1A along the line I—I.
Figure 2:
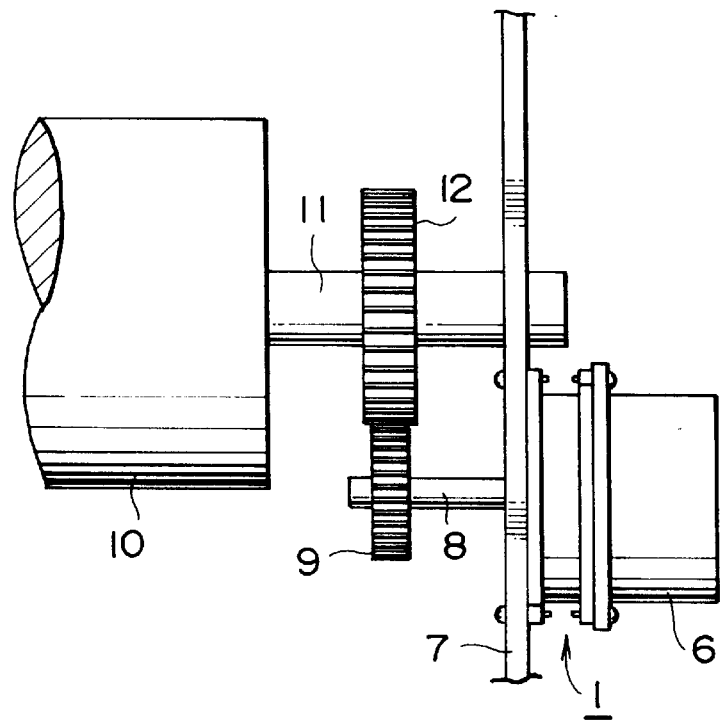
FIG. 2 is an explanatory diagram illustrating the state of attachment of the vibration isolator to a gear drive device.
Figure 3:
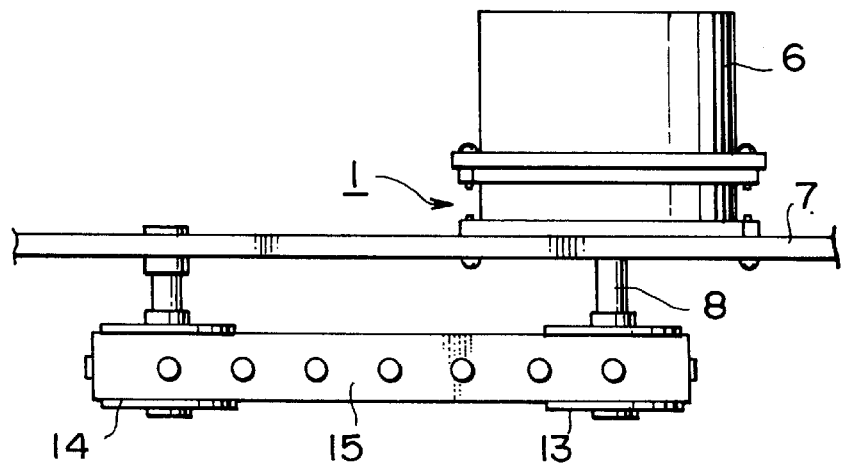
FIG. 3 is an explanatory diagram illustrating the state of attachment of the vibration isolator to a belt drive device.
Figure 4A:
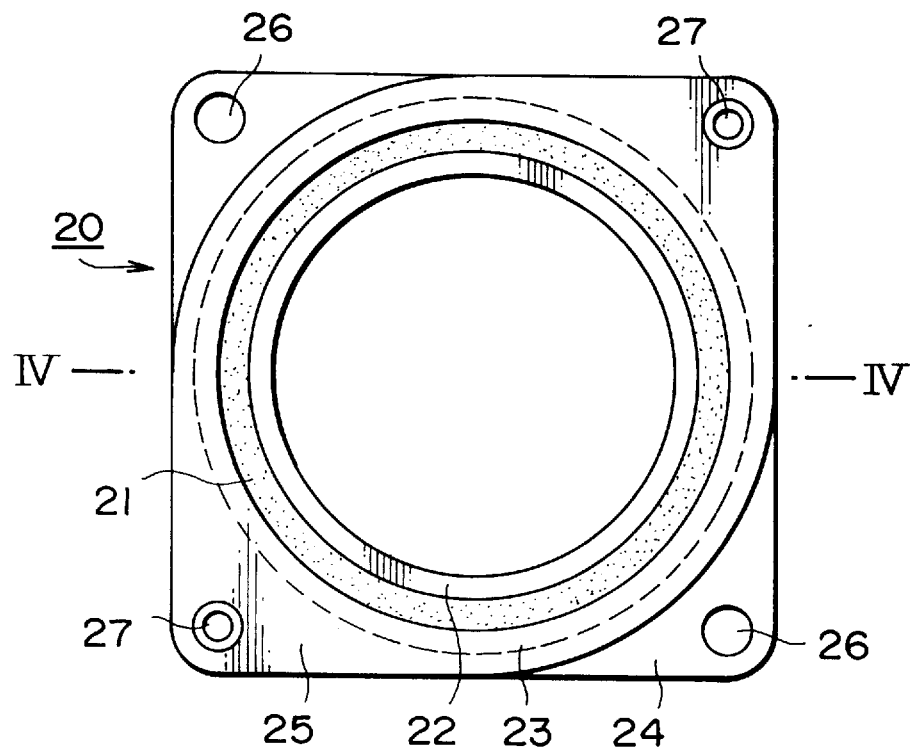
FIG. 4A is a plan view illustrating a vibration isolator for a stepping motor in one example of this invention.
Figure 4B:
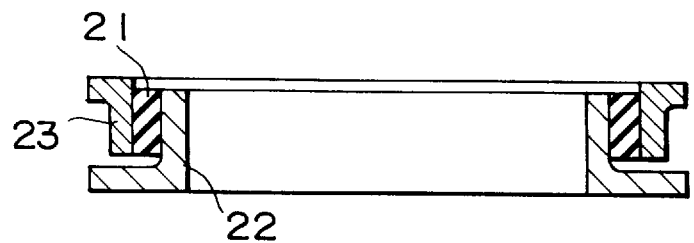
FIG. 4B is a cross section taken through FIG. 4A along the line IV—IV.

FIG. 4A and FIG. 4B are respectively a plan view and a cross section illustrating a vibration isolator for a stepping motor as one embodiment of the present invention. As shown in these diagrams, a vibration isolator 20 for a stepping motor is composed of a cylindrical elastomer body 21, an inner metal piece (an inner fixing member) 22, and an outer metal piece (an outer fixing member) 23. The inner metal piece 22 and the outer metal piece 23 respectively have flange parts 24 and 25 formed along the edges on one end sides of the cylindrical parts thereof. The flange parts 24 and 25 are thrust outwardly, symmetrically to each other and have fitting holes 26, and 27 formed therein. The inner metal piece 22 which has a smaller diameter than the outer metal piece 23 is attached to the inner diameter side of the elastomer body 21 and the outer metal piece 23 is attached to the outer diameter side of the elastomer body 21.

The material to be used for the elastomer body 21 is selected from among natural rubber (NR), chloroprene rubber (CR), ethylene-propylene-diene rubber (EPDM), butyl rubber (IIR), styrene-butadiene rubber (SBR), butadiene rubber (BR), chlorosulfonated polyethylene (CSM), silicone rubber (Si), ethylene-propylene rubber (EPM), and epichlorohydrin-ethylene oxide rubber (ECO). These may be used either singly or in the form of a combination of two or more members.

The elastomer body 21 is desired to be made of either an elastomer having a thermal conductivity of not less than $1.3 \times 10^{-3}$ cal/cm•sec•° C. or a elastomer composition containing 50 to 200 parts by weight of graphite per 100 parts by weight of rubber.

The reason for using an elastomer having a thermal conductivity of not less than $1.3 \times 10^{-3}$ cal/cm•sec•° C. is that when the stepping motor fixed through the medium of the vibration isolator is continuously operated for one hour, the temperature of the stepping motor will surpass the limit of the continuous working temperature (allowable temperature) if the thermal conductivity is less than $1.3 \times 10^{-3}$ cal/cm•sec•° C. If the stepping motor surpasses this limit of the continuous working temperature, it will cause the accuracy of positioning thereof to be degraded. In the case of a device for positioning using a ball screw and operating accurately within a submicron order, for example, the heat transmitted from the motor shaft will possibly expand the ball screw on the motor side and impart an error to the amount of feed. The working temperature of the stepping motor, therefore, is desired not to surpass 80° C. which is the limit of the continuous working temperature. While the elastomer body is desired to have as high a thermal conductivity as possible from the standpoint of the ability of the vibration isolator to radiate heat, it is thought proper for the elastomer body for use in the vibration isolator to possess a thermal conductivity not exceeding $7.1 \times 10^{-3}$ cal/cm•sec•° C. from the standpoint of the moldability and the vibration-isolating property of elastomer.

The reason for using a elastomer composition incorporating therein not less than 50 parts by weight and not more than 200 parts by weight of graphite per 100 parts by weight of rubber as the elastomer body for the vibration isolator is that the thermal conductivity of the elastomer body will never be $1.3 \times 10^{-3}$ cal/cm•sec•° C. or larger and will manifest no sufficient thermal conductivity if the amount of graphite to be incorporated is less than 50 parts by weight per 100 parts by weight of rubber. Conversely, if the amount of graphite exceeds 200 parts by weight, then the hardness of elastomer will be 80° or larger [measured by a spring type hardness tester in accordance with Japanese Industrial Standard (JIS) K 6301]. The hardness of the elastomer body to be used in this invention is desired to be in the range of from 30° to 80°. If the hardness of elastomer is 80° or larger, the moldability of elastomer will be unduly low and the work of pouring molten elastomer in a mold and molding it therein by vulcanization will be attained with difficulty. Increase in abrasion of metal pieces also will be caused.

When the elastomer body under consideration further incorporates 1 to 100 parts by weight of carbon black per 100 parts by weight of rubber in addition to the graphite, it acquires an improved thermal conductivity and an enhanced strength. If the amount of carbon black exceeds 100 parts by weight, however, the elastomer will gain excessive hardness and lose flexibility.

Figure 5:
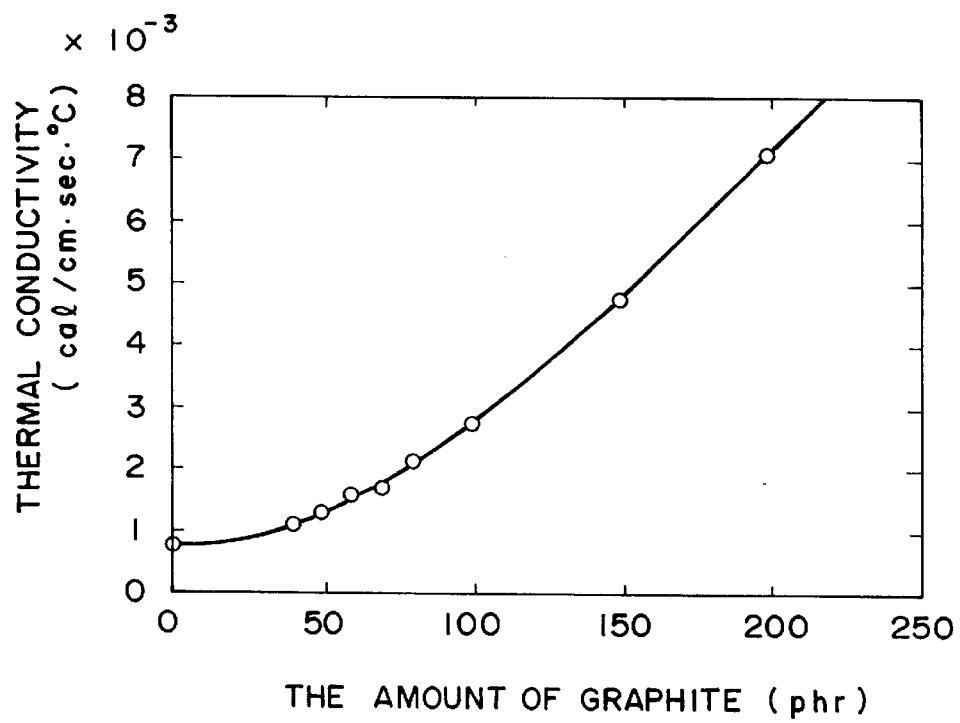
FIG. 5 is a graph showing the relation between the amount of graphite used per 100 parts by weight of elastomer and the thermal conductivity.

The thermal conductivity of elastomer and the amount of graphite to be incorporated are closely related to each other as shown in FIG. 5. Because 50 parts by weight of graphite are incorporated per 100 parts by weight of rubber, it does not necessarily follow that the elastomer body will acquire a thermal conductivity of $1.3 \times 10^{-3}$ cal/cm•sec•° C. The thermal conductivity is affected by other components (such as, for example, carbon black) of the elastomer than graphite.

The properties of vibration isolators prepared by way of embodiments as described above and those of a conventional vibration isolator are compared in Table 1. Embodiment 1 used an elastomer body of chloroprene rubber having an inside diameter of 42.2 mm, an outside diameter of 48 mm, and a thickness of 3.6 mm and Embodiment 2 an elastomer body of chloroprene rubber having an inside diameter of 42.2 mm, an outside diameter of 48 mm, and a thickness of 6 mm. Conventional Example used an elastomer body of chloroprene rubber having an inside diameter of 40 mm, an outside diameter of 52 mm, a thickness a of 5.4 mm, and a thickness b of 10 mm.

TABLE 1

|  | Embodiment | | Conventional |
| --- | --- | --- | --- |
|  | 1 | 2 | Example |
| Spring constant, m, in axial direction (kgf/mm) | 70 | 58 | 75 |
| Spring constant, n, in direction perpendicular to axis (kgf/mm) | 75 | 125 | 15 |
| Spring constant ratio (m:n) | 1:1.1 | 1:2.2 | 5:1 |
| Vibration-isolating effect | Good | Good | Good |

The embodiments mentioned above represent vibration isolators having equal or small spring constants in the axial direction and large spring constants in the direction perpendicular to the axis as compared with that of Conventional Example. When the frame to which a stepping motor was fixed through the medium of a given elastomer vibrator isolator was tested for vibration and transmissibility of vibration, it was found that the samples of the embodiments showed an improved vibration-isolating effect and a decreased displacement in the direction perpendicular to the axis as compared with the sample of Conventional Example.

Figure 6:
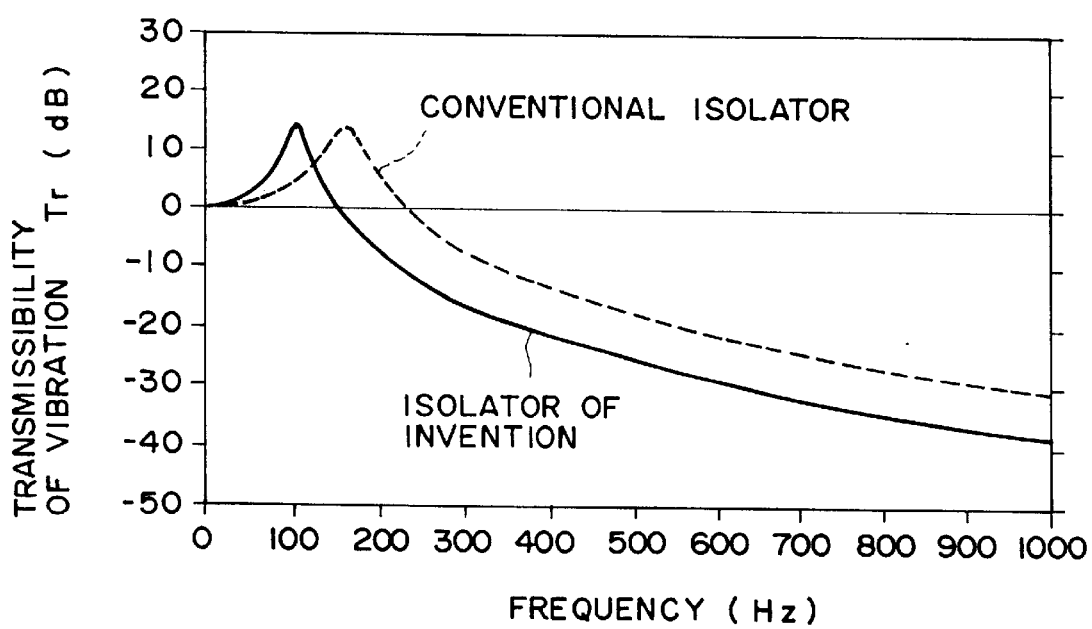
FIG. 6 is a graph showing the transmissibility of vibration by the vibration isolator of this invention and the conventional vibration isolator.

The vibration isolator 20 of the embodiment (Embodiment 2) for a stepping motor and the conventional vibration isolator 1 were tested for transmissibility of vibration by the use of a shaker in order to compare the vibration-isolating effects. The results are compared in FIG. 6. It is remarked from the graph that the vibration isolator of the embodiment showed a vibration-isolating effect at a frequency of 160 Hz or over, whereas the conventional vibration isolator did not manifest a vibration-isolating effect while the frequency was less than 250 Hz.

The present invention is not limited to the embodiments cited above. For example, the inner metal piece 22 and the outer metal piece 23 may be substituted for by like pieces made of a hard material other than metal. Further, the elastomer body does not need to be in a cylindrical shape but may be in any shapes as far as it possesses a hole permitting insertion therethrough of the drive shaft of a motor. The flange parts do not need to be formed throughout the entire edge but is only required to provide stable fixation to the frame or the motor.

Now, examples of the manufacture of the vibration isolator of this invention and the results of tests performed on the products will be described below.

(EXAMPLE 1)

An elastomer body having a thermal conductivity (measured in accordance with JIS R 2618) of $1.3 \times 10^{-3}$ cal/cm•sec•° C. was produced by kneading 100 parts by weight of chloroprene rubber, 20 parts by weight of process oil (produced by Nippon Oil Company, Limited and marketed under trademark designation of "Komorex #2"), 2 parts by weight of an antioxidant (produced by Ouchi Shinko Chemical Industrial Co., Ltd. and marketed under trademark designation of "Nocrack 630"), 1.3 parts by weight of stearic acid, 5 parts by weight of zinc white, 4 parts by weight of magnesium oxide (produced by Kamishima Chemical Industry Co., Ltd. and marketed under trademark designation of "Star-Mag M"), 0.7 part by weight of a vulcanization accelerator (produced by Kawaguchi Chemical Industry Co., Ltd. and marketed under trademark designation of "Accel 22R"), and 50 parts by weight of graphite powder (produced by Showa Denko K.K.). This elastomer body was placed in a die together with metal pieces which had undergone a zinc plating-chromating treatment and had been coated with an adhesive agent (Chemlock #205/#220) and then thermally compressed therein at 170° C. for 10 minutes to obtain a vibration isolator illustrated in FIG. 4A and FIG. 4B.

A stepping motor (produced by Sanyo Electric Co., Ltd. and marketed under product code of "103-770-1") was fixed to a frame through the medium of this vibration isolator and set to driving at a stepping angle of 1.80 and a frequency of 1000 pulses/sec. After 60 minutes following the start of the operation of the stepping motor, the surface temperature of the motor was found by a temperature recording meter (produced by Yokokawa Hokushin Electric Works, Ltd. and marketed under product code of "Model 3087") to be 77° C. (room temperature 25° C.).

(EXAMPLE 2)

An elastomer body having a thermal conductivity of $2.6 \times 10^{-3}$ cal/cm•sec•° C. was produced by following the procedure of Example 1 while changing the amount of graphite powder in the composition of the elastomer body of the vibration isolator to 100 parts by weight. When a vibration isolator was formed with this elastomer body and tested in the same manner as in Example 1, the surface temperature thereof was found to be 71° C.

(EXAMPLE 3)

An elastomer body having a thermal conductivity of $4.8 \times 10^{-3}$ cal/cm•sec•° C. was produced by following the procedure of Example 1 while changing the amount of graphite powder in the composition of the elastomer body to 150 parts by weight. When a vibration isolator was formed with this elastomer body and tested in the same manner as in Example 1, the surface temperature thereof was found to be 65° C.

(EXAMPLE 4)

An elastomer body having a thermal conductivity of $7.1 \times 10^{-3}$ cal/cm•sec•° C. was produced by following the procedure of Example 1 while changing the amount of graphite powder in the composition of the elastomer body to 200 parts by weight. When a vibration isolator was formed with this elastomer body and tested in the same manner as in Example 1, the surface temperature thereof was found to be 62° C.

(Comparative Example)

An elastomer body having a thermal conductivity of $0.7 \times 10^{-3}$ cal/cm•sec•° C. was produced by blending 100 parts by weight of chloroprene rubber with 53 parts by weight of carbon black (produced by Chubu Carbon K.K. and marketed under product code of "HTC #80") without using graphite powder. A vibration isolator was formed with this elastomer body. This vibration isolator was fixed to a stepping motor and tested in the same manner as in Example 1. The surface temperature of this isolator was found to be 82° C.

Examples 1 to 4 and Comparative Example mentioned above are collectively shown in Table 2.

TABLE 2

| | Example 1 | Example 2 | Example 3 | Example 4 | CE* |
|---|---|---|---|---|---|
| Amount of graphite (PHR) | 50 | 100 | 150 | 200 | 0 |
| Thermal conductivity $\times 10^{-3}$ (cal/cmsec) | 1.3 | 2.6 | 4.8 | 7.1 | 0.7 |
| Surface temperature (°C.) | 77 | 71 | 65 | 62 | 82 |

*CE: Comparative Example

It is clearly noted from Table 2 that the surface temperature of the stepping motor fixed through the medium of the vibration isolator of Comparative Example rose to 82° C., whereas the surface temperatures of the stepping motors fixed through the medium of the vibration isolators of the examples using elastomer compositions having thermal conductivities not less than $1.3 \times 10^{-3}$ cal/cm•sec•° C. did not rise above 80° C. It is also remarked that the surface temperature decreased in proportion as the thermal conductivity increased.

What is claimed is:

1. A vibration isolator for a motor comprising:

an elastomer body with an inner surface and an outer surface;

an inner fixing member composed of a first hard material and fixed on said inner surface of said elastomer body, said inner fixing member including a first flange part, said first flange part extending outwardly from an edge of said inner fixing member to a position beyond said outer surface of said elastomer body; and an outer fixing member composed of a second hard material and fixed on said outer surface of said elastomer body, said outer fixing member including a second flange part, said second flange part extending outwardly from an edge of said outer fixing member, wherein a ratio of a spring constant in an axial direction of said vibration isolator to that in a radial direction of said vibration isolator is in the range of 1:1 to 1:3.

2. A vibration isolator for a motor according to claim 1, wherein said elastomer body has a thermal conductivity in the range from $1.3 \times 10^{-3}$ to $7.1 \times 10^{-3}$ cal/cm•sec•° C. and contains 50 to 200 parts by weight of graphite per 100 parts by weight of rubber.

3. A vibration isolator for a motor comprising:

an elastomer body having a thermal conductivity in the range of $1.3 \times 10^{-3}$ to $7.1 \times 10^{-3}$ cal/cm•sec•° C. and containing 50 to 200 parts by weight of graphite per 100 parts by weight of rubber; and first and second fixing members composed of a hard material with said elastomer body fixed therebetween.

* * * * *